R. T. TODD.
WHEELBARROW.
APPLICATION FILED APR. 19, 1909.

931,096.  Patented Aug. 17, 1909.

Witnesses:  Inventor
J. H. Perrault.  Royal T. Todd.
H. D. MacDonald.  By Edward N. Pagelsen
    Attorney.

UNITED STATES PATENT OFFICE.

ROYAL T. TODD, OF HAMTRAMCK, MICHIGAN.

WHEELBARROW.

No. 931,096.  Specification of Letters Patent.  Patented Aug. 17, 1909.

Application filed April 19, 1909. Serial No. 490,711.

*To all whom it may concern:*

Be it known that I, ROYAL T. TODD, a citizen of the United States, and a resident of Hamtramck, in the county of Wayne and State of Michigan, have invented a new and Improved Wheelbarrow, of which the following is a specification.

This invention relates to vehicles having wheels centrally mounted at one end, and the object of this improvement is to provide a wheel-barrow which shall be so constructed that the minimum of load shall be carried by the person operating it.

This invention consists in a wheel-barrow having the usual frame, body, front wheel and handles, together with a trailing wheel which will carry a large portion of the load in the barrow.

Figure 1:
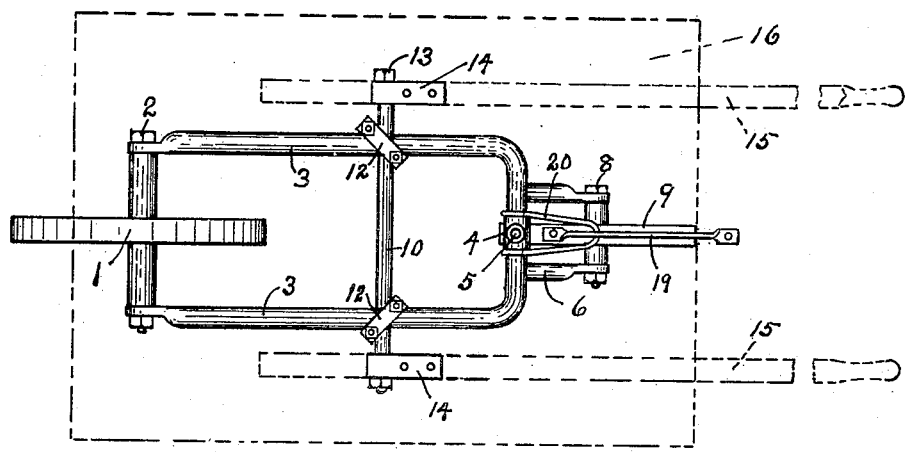
Figure 2:
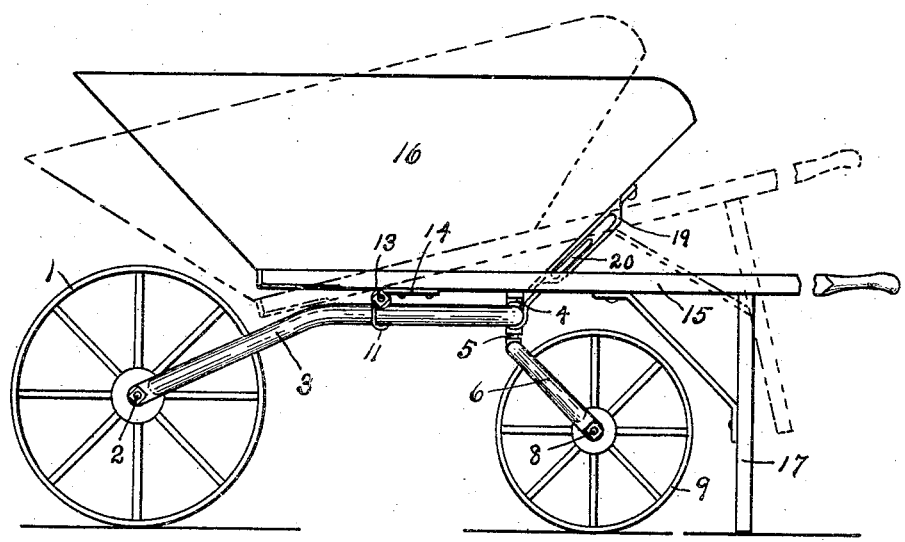

In the accompanying drawing, Figure 1 is a plan of the frame and wheels, the barrow and handles being indicated by dotted lines. Fig. 2 is an elevation of the wheelbarrow.

Similar reference characters refer to like parts in both views.

The usual front wheel 1 is mounted on the rod 2 which extends between the side bars 3. These side bars connect at their rear ends to a socket 4 which receives a swivel pin 5 of the rear wheel frame 6. The arms of this swiveled frame extend downward and are connected by a bolt 8 which furnishes a bearing for the wheel 9, which will trail in the track of the front wheel.

A tube 10 is secured to the side bars 3 by means of the clips 11 and plates 12. A bolt 13 extends through this tube and carries hinge-plates 14 on its outer ends. Handles 15 are secured to these hinge-plates and to the handles is secured the barrow or body 16. Legs 17 may also be secured to the handles. A slotted plate 19 may be secured to the rear of the barrow and a U shaped link 20, mounted on the frame near the socket 4, extends through the slot.

The barrow is filled in the ordinary way. When the ends of the handles are raised, they turn about the bolt 13 instead of on the rod 2. The weight instead of being divided between the wheel 1 and the operator is carried almost entirely by the frame. It may even happen that it is necessary to hold down the outer ends of the handles. The plate 19 and link 20 will prevent the rear of the barrow swinging up too far, while movement in the opposite direction is limited by contact between the frame and the barrow. Because of the fact that the wheels run in practically the same track, any path is wide enough for this vehicle.

Any desired construction of the various parts may be employed without departing from the spirit of the invention.

What I claim therefore and desire to secure by Letters Patent is:—

1. In a wheel-barrow, the combination of a frame, a wheel centrally mounted at the front end thereof, a second wheel centrally swiveled at the rear end of the frame, and a barrow hinged to said frame.

2. In a wheel-barrow, the combination of a U shaped main frame having a socket at the middle of the bow, a rod extending between the ends of the arms, a wheel mounted on said rod, a rear frame having a pin revoluble in said socket, a wheel mounted in said rear frame, a rod secured to said main frame transversely to the line of the wheels, a hinge-plate mounted on each end of the rod, handles secured to said plates, a barrow secured to said handles, and means to limit the movement of said barrow.

3. In a wheel-barrow, the combination of a frame, a wheel centrally mounted at the front end thereof, a second wheel centrally swiveled at the rear end of the frame, a barrow hinged to said frame, a slotted plate secured to the barrow and a link secured to the frame and passing through the slotted plate to limit the movement of the barrow.

In testimony whereof I have signed this application in the presence of two subscribing witnesses.

ROYAL T. TODD.

Witnesses:
H. D. MACDONALD,
FLORA ULRICH.